J. B. EATON & C. LATHAM.
Machine for Cutting and Threading Pipe.
No. 206,095. Patented July 16, 1878.
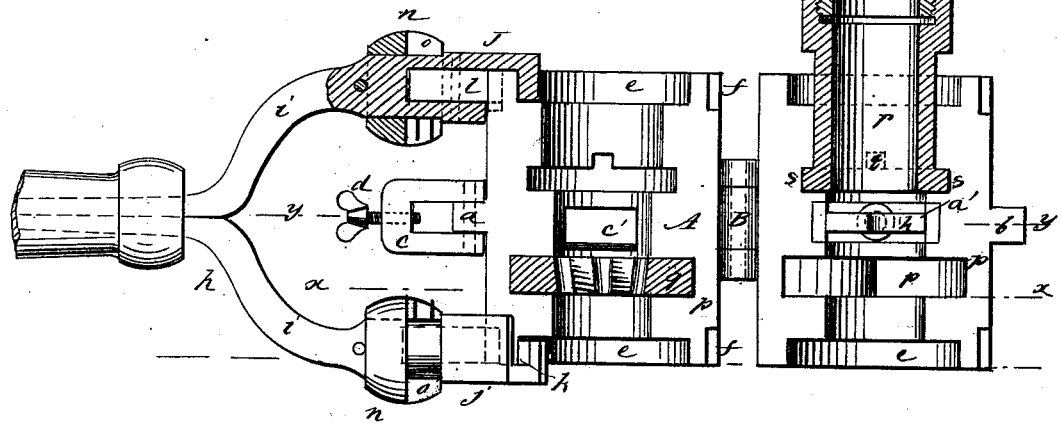
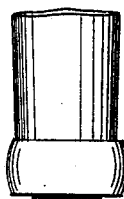
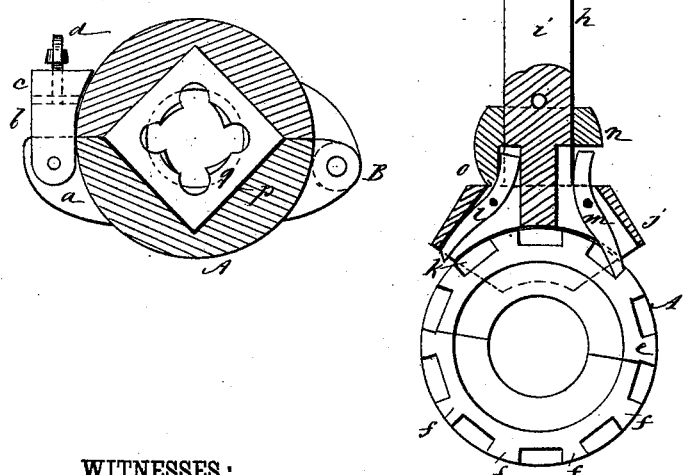
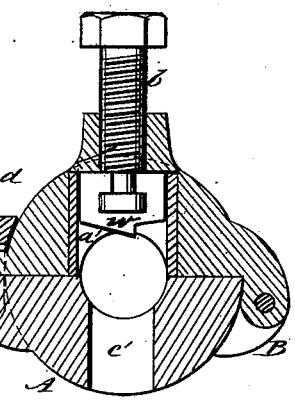
WITNESSES:
C. Neveux
C. Sedgwick
INVENTOR:
J. B. Eaton
C. Latham
BY Munn & Co
ATTORNEYS.

UNITED STATES PATENT OFFICE.

JOSEPH B. EATON AND CHARLES LATHAM, OF SHAMOKIN, PENNSYLVANIA; SAID EATON ASSIGNOR TO SAID LATHAM.

IMPROVEMENT IN MACHINES FOR CUTTING AND THREADING PIPE.

Specification forming part of Letters Patent No. 206,095, dated July 16, 1878; application filed April 2, 1878.

*To all whom it may concern:*

Be it known that we, JOSEPH B. EATON and CHARLES LATHAM, of Shamokin, in the county of Northumberland and State of Pennsylvania, have invented a new and Improved Machine for Cutting and Threading Pipe, of which the following is a specification:

Figure 1 is a plan view, partly in section, of our improved pipe cutting and threading machine. Fig. 2 is an end elevation, partly in section. Fig. 3 is a transverse section taken on line $x\ x$ in Fig. 1. Fig. 4 is a transverse section taken on line $y\ y$ in Fig. 1.

Similar letters of reference indicate corresponding parts.

Our invention relates to machines for cutting and threading metal pipes.

Referring to the drawing, A is a sleeve, which is divided longitudinally, and provided with hinges B, and with lugs $a\ b$ diametrically opposite the hinges. To the lug $a$ is pivoted a yoke, $c$, which is provided with a thumb-screw, $d$, and is capable of swinging over and clamping the lug $b$. Upon each end of the sleeve there is a rim, $e$, on the periphery of which there are teeth $f$, which are engaged by pawls $l\ m$ in the forked handle $h$. The handle has two arms, $i$, upon the ends of which there are guides $j$, having curved slots $k$, for receiving the rims $e$. The guides $j$ are recessed to receive the oppositely-arranged pawls $l\ m$, and upon the arms $i$ there are movable collars $n$, each having a cam-lug, $o$, which is capable of engaging the pawls, so as to throw either of them out of engagement with the teeth on the rims $e$. A square recess, $p$, is formed in the sleeve A for receiving the screw-cutting die $q$. A pipe-guide, $r$, having a flange, $s$, is fitted to the sleeve A, and is provided with a lug-pin, $t$, which is fitted to a notch in the sleeve and prevents the guide from turning. A short sleeve, $u$, having an external thread of the same lead as the thread it is desired to cut on the pipe, is screwed into the outer end of the guide, and is provided with a pointed set-screw, V, which clamps the pipe firmly in the sleeve. Between the guide $r$ and the die $q$ there is a cutter, $w$, which moves in a recess, $a'$, formed in the side of the sleeve A, and has formed in it a T-shaped notch for receiving the end of the screw $b'$, which passes through a threaded boss on the side of the sleeve. Opposite the recess $a'$ there is an aperture, $c'$, for the discharge of chips.

The sleeve A is readily clasped around a pipe when it is to be cut, and the cutter is forced into the metal as the sleeve A is revolved by means of the handle and pawls. The thread is cut by slipping the guide over the pipe and clamping said pipe in the sleeve $u$ by means of the screw $v$. The sleeve A is then rotated by means of the handle and ratchets until the thread is formed. The guide $r$ and sleeve A are led forward by the thread on the sleeve $u$. After the thread is cut the die is removed from the pipe by turning the sleeve in the opposite direction after having reversed the pawls by turning the cam-collars $n$.

Having thus described our invention, we claim as new and desire to secure by Letters Patent—

The forked handle $h$, having the pawls $l\ m$, and collars $n$, in combination with the die-holding sleeve A, having the ratchet-rims $e$, substantially as shown and described.

JOSEPH B. EATON.
CHARLES LATHAM.

Witnesses:
W. H. GILGER,
JOHN HANCOCK